United States Patent [19]

Fürsich et al.

[11] Patent Number: 4,566,786
[45] Date of Patent: Jan. 28, 1986

[54] METHOD OF COPYING COLOR EXPOSURES

[75] Inventors: Manfred Fürsich, Taufkirchen; Helmut Treiber, Munich; Berthold Fergg, Taufkirchen; Günter Findeis, Sauerlach; Wolfgang Zahn, Munich, all of Fed. Rep. of Germany

[73] Assignee: Agfa-Gevaert Aktiengesellschaft, Leverkusen, Fed. Rep. of Germany

[21] Appl. No.: 717,323

[22] Filed: Mar. 29, 1985

[30] Foreign Application Priority Data

Apr. 5, 1984 [DE] Fed. Rep. of Germany ........ 3412881

[51] Int. Cl.⁴ .................... G03B 27/32; G03B 27/80
[52] U.S. Cl. ............................................ 355/77; 355/38
[58] Field of Search ................. 355/38, 68, 77, 88; 356/202, 404

[56] References Cited

U.S. PATENT DOCUMENTS

| | | | |
|---|---|---|---|
| 4,101,217 | 7/1978 | Fergg et al. | 355/38 |
| 4,168,121 | 9/1979 | Freier et al. | 355/38 |
| 4,192,605 | 3/1980 | Fergg et al. | 355/38 |
| 4,244,653 | 1/1981 | Asai et al. | 356/404 |
| 4,244,655 | 1/1981 | Asai et al. | 355/38 X |
| 4,279,502 | 7/1981 | Thurm et al. | 355/38 |
| 4,279,505 | 7/1981 | Ursprung et al. | 355/38 X |
| 4,315,686 | 2/1982 | Fergg et al. | 355/38 |
| 4,406,538 | 9/1983 | Bühler | 355/38 X |
| 4,464,045 | 8/1984 | Findeis et al. | 355/38 |
| 4,492,458 | 1/1985 | Bickl et al. | 355/77 X |

*Primary Examiner*—Richard A. Wintercorn
*Attorney, Agent, or Firm*—Peter K. Kontler

[57] ABSTRACT

A film has a series of exposed and developed negatives. Each negative is scanned at a multiplicity of regions, and the densities of each region in the three primary colors are measured. A blue/red density differential is derived for each region by subtracting the red density of a respective region from its blue density. The neutral density of each region is calculated, and every region is assigned a coordinate on a plot of blue/red density differential versus neutral density. According to one embodiment, the blue/red density differential for each region having a neutral density equal to or greater than a limiting value is then subtracted from the blue/red density differential given by a characteristic curve for the film. The differences obtained in this manner are analyzed, at least for selected negatives, and the minimum difference for each selected negative is determined. The region corresponding to the minimum difference is that region of a negative having the maximum blue density. The blue/red density differential for the region of maximum blue density is compared with a pair of reference values derived from respective reference curves representing blue/red density differential as a function of neutral density. Based on the results of this comparison, each selected negative is classified as to whether it was exposed by artificial light or natural light, and is assigned an appropriate color correction factor for copying. Another embodiment is employed if the characteristic curve is found to lie near one of the reference curves. Here, the steps of subtracting blue/red density differentials and analyzing the resulting differences are omitted, and all negatives of the film are immediately classified as having been exposed by artificial light.

17 Claims, 2 Drawing Figures

METHOD OF COPYING COLOR EXPOSURES

BACKGROUND OF THE INVENTION

The invention relates generally to color copying.

More particularly, the invention relates to a method of copying color exposures which may have been made with light of different color temperature, e.g. color exposures which may have been made using either artificial light or sunlight.

When copying color exposures in accordance with the neutral gray compensation principle, color correction factors are employed in order to produce copies which, overall, have an essentially neutral gray color composition. Since the values of the correction factors depend upon the type of light used to illuminate the exposures, it is necessary to determine how the latter were exposed.

The West German Offenlegungsschift No. 27 22 321=U.S. Pat. No. 4,192,605 discloses a copying method in which the type of light is established by measuring the density of a color exposure in each of the three primary colors. The difference between the densities of two colors affected by the type of illumination is calculated, and this difference compared with a reference value to thereby determine how the exposure was made.

In the preceding method, an integral or overall density is obtained for each color. In other words, only one density measurement each in red, green and blue is made on each exposure. The differences calculated from these integral densities are strongly influenced by the color distribution in the exposure. Thus, intensely yellow motifs, e.g., yellow-clad people stationed in front of a brick wall, cannot be distinguished in an exposure made with artificial light having a low color temperature.

Other color copying methods have become known in which the density in each primary color is measured at a multiplicity of regions of an exposure. The densities are evaluated statistically in order to determine the type of light used in making the exposure. These methods give rise to the same effects as for integral density measurements.

OBJECTS AND SUMMARY OF THE INVENTION

It is an object of the invention to provide a method which makes it possible to distinguish between exposures illuminated by artificial light such as lamplight and exposures illuminated by natural light such as sunlight with a high degree of reliability.

Another object of the invention is to provide a method which enables improved copies of exposures to be obtained.

The preceding objects, and others which will become apparent as the description proceeds, are achieved by the invention.

According to one embodiment of the invention, a method of copying color exposures comprises the following steps:

A. Measuring the densities of a multiplicity of regions of a selected exposure in each primary color.

B. Deriving a density differential for a selected region of a predetermined group of the regions by calculating the difference between the blue and red densities of the selected region. The latter is chosen on the basis of having a blue density which is a maximum for the predetermined group of regions.

C. Classifying the selected exposure as to the probable type of illumination used to make the same by comparing a first value which includes the density differential with at least one reference value. Preferably, the first value and the referenced value are chosen in such a manner that the selected exposure is classified as having been made with natural light when the first value exceeds the reference value.

D. Assigning a correction factor to the selected exposure based on the result of the classifying step. The correction factor may, for example, be a color correction factor based on the principle of neutral gray compensation.

E. Copying the selected exposure using the correction factor.

A blue/red density differential may be derived for each region of the predetermined group. The method then further includes the steps of calculating the neutral density of each region of the group, and deriving a difference value for each region of the group. The step of deriving the difference values involves the use of a characteristic curve which is applicable to the selected exposure and represents blue/red density differential as a function of neutral density. Thus, the step of deriving the difference values is performed by calculating the difference between the density differential of each region of the predetermined group and the density differential of the characteristic curve at the neutral density of the respective region.

The selected region of the predetermined group, i.e., the region having a blue density which is a maximum for the group, may be identified by virtue of the fact that it has a preselected difference value. Preferably, the difference values are established in such a manner that the difference value for the selected region is a minimum difference value for the group.

The West German Offenlegungsschrift No. 29 12 130 teaches a method of determining the amount of light in each primary color required to copy the exposures of a color film. The respective exposures of the film are scanned at a multiplicity of regions, and the densities of each region in the three primary colors are determined. The differences between the densities of the various colors are calculated for each region, as is the neutral density of each region. Each density differential in combination with the neutral density defines a point on a plot of density differential versus neutral density. When the points for the various regions are plotted, a series of curves is obtained. With the exception of those locations having color dominants, these curves are characteristic of the film.

The just-mentioned Offenlegungsschrift describes a selection or weighting procedure to be applied to the individual color densities obtained during the scanning operation. The purpose of this procedure is to insure that the curves are characteristic of the film regardless of the motifs of the respective exposures. The curves enable specific values which are characteristic of the film to be established for each exposure. These values make it possible to correct for a color cast which may be present in the exposure regardless of the particular motif and without suppressing color dominants.

The method of the West German Offenlegungsschrift No. 29 12 130=U.S. Pat. No. 4,279,502 does not guarantee good results for exposures made with artificial light. The reason is that it is not possible to readily distinguish between an exposure made with artificial light and a dominant having a large proportion of red.

The invention is based on the premise that all regions of an exposure made with artificial light have an intense red-yellow cast. Such regions have a very low blue density. For normal exposures, it is found that, on a plot of blue density minus red density versus neutral density, the points corresponding to almost all scanned regions are uniformly distributed about the respective characteristic curve. On the other hand, all points for an exposure having a very low blue density throughout will lie well below the characteristic curve representing blue density minus red density as a function of neutral density.

As outlined above, the method of the invention may include a step of deriving difference values for a selected exposure employing a characteristic curve which is applicable to such exposure. If the selected exposure constitutes part of a web of photosensitive material, e.g., part of a film, having additional exposures, the characteristic curve may be developed in accordance with the teachings of the West German Offenlegungsschrift No. 29 12 130. Derivation of the characteristic curve based on these teachings involves measuring the densities of a multiplicity of regions of the various exposures in each primary color; deriving a blue/red density differential for each region; and calculating the neutral density of each region. The blue/red density differential and neutral density of a respective region together define a point on a plot of blue/red density differential versus neutral density thereby making it possible to develop a curve which represents blue/red density differential as a function of neutral density. The weighting procedure described in the just-mentioned Offenlegungsschrift is employed to insure that the curve is characteristic of the web.

Alternatively, the characteristic curve may be one which is characteristic of the type of photosensitive material constituting the selected exposure, as opposed to being characteristic of the specific web undergoing processing.

According to another embodiment of the invention, a method of copying color exposures constituting part of a web of photosensitive material comprises the following steps:

A. Measuring the densities of a multiplicity of regions of each exposure in each primary color.

B. Deriving a density differential for each region by calculating the difference between the blue and red densities of the respective regions.

C. Calculating the neutral density of each region.

D. Assigning a point to each region on a plot of blue/red density differential versus neutral density.

E. Counting the number of regions for which the respective points are located proximate to a reference curve of blue/red density differential versus neutral density.

F. Classifying each of the exposures as having been made with artificial light when the points for the overwhelming majority of the regions are disposed in the vicinity of the reference curve.

G. Assigning a correction factor of large magnitude to each of the exposures when the points for the overwhelming majority of the regions are located proximate to the reference curve. The correction factor may, for instance, be a color correction factor based on neutral gray compensation.

H. Copying each of the exposures using the assigned correction factor.

The novel features which are considered as characteristic of the invention are set forth in particular in the appended claims. The improved method itself, however, together with additional features and advantages thereof, will be best understood upon perusal of the following detailed description of certain specific embodiments with reference to the accompanying drawings.

DESCRIPTION OF THE PREFERRED EMBODIMENTS

Figure 1:
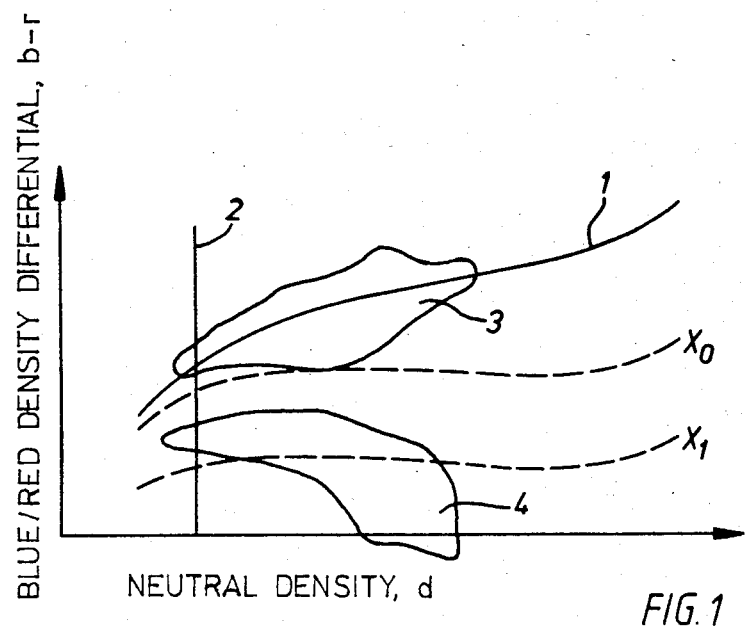
FIG. 1 is a plot of blue/red density differential versus neutral density showing the distributions of points for a pair of exposures made with different types of light.

FIG. 1 shows a plot of blue/red density differential versus neutral density. The abscissa in FIG. 1 represents the neutral or gray density d of a region of an exposure while the ordinate represents the blue/red density differential of the region, that is, the difference between the blue and red densities of the region. The blue/red density differential is here assumed to equal the blue density b of the region minus the red density r thereof.

The reference numeral 1 in FIG. 1 identifies a characteristic curve for a film or web of photosensitive material having a series of negatives or exposures. The characteristic curve 1 is derived in accordance with the teachings of the West German Offenlegungsschrift No. 29 12 130 by measuring the densities of a multiplicity of regions of the respective negatives in each of the three primary colors. The densities of strongly colored regions are assigned a lesser weight than the remaining densities or are disregarded altogether, and the densities of the various regions are subjected to an averaging procedure. The characteristic curve 1 is developed from the results of the averaging procedure and, for each neutral density, yields a specific value of blue density minus red density which will produce neutral gray copies of the film. If color casts due to the illumination used in exposing the negatives are disregarded, usable copies are obtained on the basis of the characteristic curve 1.

A line 2 paralleling the ordinate intersects the characteristic curve 1 in the vicinity of the left end portion thereof. The line 2 is situated at a limiting value of the neutral density which approximates the density of the mask employed during manufacture of the film. It is generally not possible to obtain suitable measurements at neutral densities below this limiting value 2. Accordingly, only the group composed of those regions having neutral densities in excess of the limiting value 2 are considered when using the plot of FIG. 1 to determine the amount of light in a primary color required to copy a negative.

A pair of dashed curves $X_0$ and $X_1$ is disposed below the characteristic curve 1. The curves $X_0$ and $X_1$, which may be referred to as reference curves, exhibit a generally upward trend with increasing neutral density. The distance between the characteristic curve 1 and each of the reference curves $X_0$ and $X_1$ varies with neutral density and, in particular, increases linearly with increasing neutral density above the limiting value 2.

The reference numeral 3 identifies an area which is circumscribed by a closed curve. The area 3 is approximately bisected by the characteristic curve 1 so that the portion of the area 3 located above the characteristic curve 1 has about the same size as the portion of the area 3 located below the characteristic curve 1. The area 3 corresponds to a negative which has an approximately neutral color composition overall, i.e., which is free of color dominants and color casts. The coordinates of all regions of the negative are included within the area 3. It will be observed that this negative has a normal proportion of the color blue. Consequently, it is highly likely that the negative was exposed by natural light such as sunlight.

Below the area 3 is a second area 4 which is again circumscribed by a closed curve. The area 4 is located well below the characteristic curve 1, and is also disposed below the reference curve $X_0$. However, the reference curve Xl passes through the area 4 so that a portion of the latter is located above the reference curve $X_1$ while a portion thereof is situated below the reference curve $X_1$. The area 4 represents a negative which has a very low blue density throughout and is made up primarily of regions having a red and orange color composition. The negative corresponding to the area 4 was exposed using artificial light such as that from a lamp or a bulb, and the coordinates of all regions of the negative are contained within the area 4. It will be understood that the area 4 represents but one of many possible distributions for the coordinates of the regions of negatives exposed by artificial light. Nevertheless, all negatives exposed using artificial light possess the common feature that, as a rule, there are no coordinates in the vicinity of the characteristic curve 1.

Figure 2:
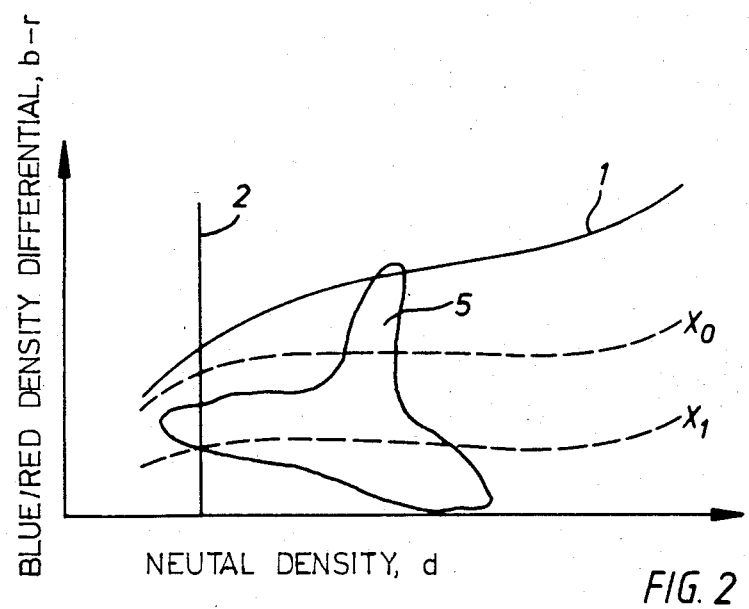
FIG. 2 is similar to FIG. 1 but shows the distribution of points for yet another exposure.

Referring to FIG. 2, this illustrates a plot which is identical to FIG. 1 as far as the characteristic curve 1, the reference curves $X_0$ and $X_1$, and the limiting neutral density 2 are concerned. FIG. 2 depicts an area 5 which is circumscribed by a closed curve and represents a negative different from either of those corresponding to the areas 3 and 4. The area 5 contains the coordinates of all regions of the respective negative. It will be observed that the area 5 has a distinct upward protrusion in the central part of the neutral density range covered by the area 5. This protrusion extends to the vicinity of the characteristic curve 1 and indicates that the negative corresponding to the area 5 includes one or more regions having average proportions of blue and red. Experience has shown that, while large portions of negatives of this type have characteristics similar to those of negatives made with artificial light, regions having a normal proportion of the color blue do not occur in negatives exposed by artificial light. Consequently, such negatives cannot have coordinates in the vicinity of the characteristic curve 1.

The preceding considerations indicate which cirteria should be examined prior to copying a negative in order to establish whether the negative was exposed by artificial or natural light. Assuming the presence of a film having a series of exposed and developed negatives, one embodiment of the method according to the invention is as follows:

Each negative is scanned at a multiplicity of regions in order to measure the densities of the respective regions in the three primary colors blue, red and green. A blue/red density differential is derived for each region by subtracting the red density of the respective region from its blue density. In addition, the neutral density of each region is calculated.

The various regions of each negative are now assigned coordinates on a plot of blue/red density differential versus neutral density, that is, the point defined by the blue/red density differential and the neutral density of each region is plotted. This plot includes a characteristic curve 1 for the film, as well as the reference curves $X_0$ and $X_1$. The characteristic curve 1 may be derived in accordance with the teachings of the West German Offenlegungsschrift No. 29 12 130 using the densities obtained during the previous scanning of the negatives. Alternatively, the characteristic curve 1 may be a curve which is characteristic of the particular type of film, as opposed to the characteristic curve obtained on the basis of the West German Offenlegungsschrift No. 29 12 130 which is characteristic of the specific film being processed.

Those regions having a neutral density less than the limiting neutral density 2 are disregarded in the following operations.

For each negative, difference values are derived for the group of regions having neutral densities equal to or greater than the limiting neutral density 2. Each difference value is obtained by subtracting the blue/red density differential of a respective region from the blue/red density differential given by the characteristic curve 1 at the neutral density of this region. The minimum difference value for each negative is then established. The region of a negative having the minimum difference value has the greatest blue density of the respective group of regions, and the point representing this region on the plot of blue/red density differential versus neutral density will usually lie nearer the characteristic curve 1 than the points representing the other regions of the same negative.

For each negative, the point for the region having the minimum difference value is compared with the reference curves $X_0$ and $X_1$. If this point lies above the reference curve $X_0$, the corresponding negative is assumed to have been exposed by natural light such as sunlight and is handled as such during copying. Thus, the negative is assigned a low color correction factor, and is then copied using this factor. The correction factor is calculated on the basis of the neutral gray compensation principle. Even though the points for certain regions of the negative may deviate greatly from the characteristic curve 1, these regions will nevertheless be fully reproduced on the copies made from the negative.

If the point for the region having the minimum difference value is located between the reference curves $X_0$ and $X_1$, e.g., in that portion of the area 4 of FIG. 1 above the reference curve $X_1$, this point is spaced relatively far from the characteristic curve 1, and a larger color correction than in the previous case is necessary. The negative is now assigned a partial color correction factor such as, for example, a correction factor of 50%. The correction factor is again based on the principle of neutral gray compensation.

If all of the points for a negative lie below the reference curve $X_1$, it is assumed that the negative was exposed by artificial light, such as that from a lamp or a bulb, having a very intense yellow component. Full color correction is required in this situation, and a color correction factor of the order of 100% is assigned to the negative. As before, the correction factor is calculated on the basis of the principle of neutral gray compensation.

It is possible that neighboring negatives were exposed under the same conditions but that, in spite of this, the point representing the region of maximum blue density of one negative lies immediately above the reference curve $X_0$ while the corresponding point of the other negative lies immediately below the reference curve $X_0$. This would normally result in the assignment of different color correction factors to the two negatives even though it may be appropriate to use the same correction factor for each. Another embodiment of the invention enables this to be avoided. Thus, when the point representing the region of maximum blue density of a given negative lies below the reference curve $X_1$ or the reference curve $X_0$ so that the negative is classified as having been made with artificial light, the neighboring negative is examined to determine the difference between the blue/red density differential of its region of maximum blue density and the corresponding blue/red density differential of the characteristic curve 1. If this difference is approximately the same as that for the region of maximum blue density of the given negative, both negatives are copied using the same color correction factor. Depending upon the positions of the points representing the regions of maximum blue density relative to the reference curves $X_0, X_1$, a moderate or large correction factor will be required.

In the event that the given negative has a neighboring negative on its leading side as well as its trailing side, the operation of determining the difference between the blue/red density differential of the region of maximum blue density and the blue/red density differential of the characteristic curve 1 may be performed for either or both of the neighboring negatives. If this difference is determined for both neighboring negatives and it is found that the difference in each case is approximately the same as that for the region of maximum blue density of the given negative, then all three negatives are copied using the same color correction factor.

There are cases where a succession of negatives, and even all the negatives of a film, are exposed by artificial light. Under such circumstances, a characteristic curve of blue/red density differential derived in accordance with the teachings of the West German Offenlegungsschrift No. 29 12 130 will lie close to the reference curve $X_0$ or $X_1$. Similarly, the points representing the overwhelming majority of the regions of the respective negatives will be located proximate to the reference curve $X_0$ or $X_1$. In a situation of this type, an investigation of the differences between the blue/red density differentials of the various regions of the negatives and the corresponding blue/red density differentials given by the characteristic curve 1 will not be meaningful. Thus, according to a further embodiment of the invention, if a characteristic curve derived on the basis of the just-mentioned Offenlegungsschrift is found to be located in the vicinity of the reference curve $X_0$ or $X_1$, no attempt is made to identify regions of maximum blue density, and the operation of calculating the differences between the blue/red density differentials of the various regions and the respective blue/red density differentials of the characteristic curve is omitted. Instead, the entire film corresponding to this characteristic curve is classified as having been exposed by artificial light. All negatives of the film are accordingly copied using a color correction factor of large magnitude for example between 50 and 100%.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of copying color exposures comprising the steps of:
    (a) measuring the densities of a multiplicity of regions of a selected exposure in each primary color;
    (b) deriving a density differential for a selected region of a group of said regions by calculating the difference between the blue and red densities of said selected region, said selected region having a blue density which is a maximum for said group;
    (c) classifying said selected exposure as to the probable type of illumination used to make the same by comparing a first value which includes said density differential with at least one reference value;
    (d) assigning a correction factor to said selected exposure based on the result of the classifying step; and
    (e) copying said selected exposure using said correction factor.

2. The method of claim 1, wherein the step of deriving a density differential is performed for each region of said group; and further comprising the steps of calculating the neutral density of each region of said group, deriving a difference value for each region of said group, and identifying said selected region as the region of said group having a preselected difference value, the step of deriving difference values employing a characteristic curve which is applicable to said selected exposure and represents blue/red density differential as a function of neutral density, and the step of deriving difference values being performed by calculating the difference between the density differential of each region of said group and the density differential of said characteristic curve at the neutral density of the respective region.

3. The method of claim 2, wherein said preselected difference value is a minimum difference value for said group.

4. The method of claim 2, said selected exposure constituting part of a web of photographic material having additional exposures; and wherein said characteristic curve is developed by performing the step of measuring densities for each exposure, and the steps of deriving a density differential and calculating the neutral density for each region.

5. The method of claim 2, said selected exposure being constituted by a selected type of photographic material; and wherein said characteristic curve is characteristic of said selected type of photographic material.

6. The method of claim 2, wherein said selected exposure constitutes part of a web of photographic material having an additional exposure which is adjacent to said selected exposure, and said selected exposure is classified as having been made with artificial light, the steps of measuring densities, deriving density differentials, calculating neutral densities, deriving difference values, and identifying a selected region of maximum blue density being performed for said one neighboring exposure; and further comprising the step of comparing the preselected difference values for said exposures, said exposures being assigned the same correction factor when said preselected difference values are at least approximately equal.

7. The method of claim 6, said web having another exposure which is adjacent to said selected exposure so that the latter is flanked by said additional and other exposures; and wherein the steps of measuring densities, deriving density differentials, calculating neutral densities, deriving difference values, identifying a selected region of maximum blue density, and comparing preselected difference values are performed for said other exposure, said other exposure being assigned the same correction factor as said selected exposure when the preselected difference values for the latter and said other exposure at least approximate one another.

8. The method of claim 1, wherein said selected exposure is classified as having been made with natural light when said first value exceeds said one reference value.

9. The method of claim 1, wherein said correction factor is a color correction factor based on the principle of neutral gray compensation.

10. The method of claim 1, wherein said one reference value increases with increasing neutral density.

11. The method of claim 1, wherein the classifying step comprises comparing said first value with said one reference value and an additional reference value, said correction factor being selected to provide partial correction when said first value lies between said reference values, and said correction factor being selected to provide full correction when said first value is smaller than the smaller of said reference values.

12. The method of claim 11, wherein each of said reference values constitutes a point on a respective curve of blue/red density differential versus neutral density.

13. The method of claim 11, wherein each of said reference values increases with increasing neutral density.

14. The method of claim 1, wherein said group includes only some of said regions, and each region of said group has a neutral density which at least equals a predetermined value, each of the remaining regions having a neutral density less than said predetermined value.

15. A method of copying color exposures constituting part of a web of photosensitive material, said method comprising the steps of:
 (a) measuring the densities of a multiplicity of regions of each exposure in each primary color;
 (b) deriving a density differential for each region by calculating the difference between the blue and red densities of the respective region;
 (c) calculating the neutral density of each region;
 (d) assigning a point to each region on a plot of blue/red density differential versus neutral density;
 (e) counting the number of regions for which the respective points are located proximate to a reference curve of blue/red density differential versus neutral density.
 (f) classifying each of said exposures as having been made with artificial light when the points for the majority of said regions are disposed in the vicinity of said reference curve;
 (g) assigning a correction factor of large magnitude to each of said exposures when the points for the majority of said regions are located proximate to said reference curve; and
 (h) copying each of said exposures using the assigned correction factor.

16. The method of claim 15, wherein said correction factor is a color correction factor based on the principle of neutral gray compensation.

17. The method of claim 15, wherein said reference curve rises with increasing neutral density.

* * * * *